(12) United States Patent
Wassef

(10) Patent No.: US 12,725,166 B2
(45) Date of Patent: Sep. 1, 2026

(54) PAYMENT PROCESSING SYSTEM

(71) Applicant: KYRO CARD CAPITAL PTY LTD, Sydney (AU)

(72) Inventor: Emile Wassef, Sydney (AU)

(73) Assignee: KYRO CARD CAPITAL PTY LTD, Sydney (AU)

( * ) Notice: Subject to any disclaimer, the term of this patent is extended or adjusted under 35 U.S.C. 154(b) by 0 days.

(21) Appl. No.: 18/853,345

(22) PCT Filed: Jul. 17, 2023

(86) PCT No.: PCT/AU2023/050655
§ 371 (c)(1),
(2) Date: Oct. 1, 2024

(87) PCT Pub. No.: WO2024/031127
PCT Pub. Date: Feb. 15, 2024

(65) Prior Publication Data

US 2025/0245669 A1 Jul. 31, 2025

(30) Foreign Application Priority Data

Aug. 9, 2022 (AU) ................................ 2022902236

(51) Int. Cl.
*G06Q 20/00* (2012.01)
*G06Q 20/20* (2012.01)
(Continued)

(52) U.S. Cl.
CPC ......... *G06Q 20/407* (2013.01); *G06Q 20/201* (2013.01); *G06Q 20/204* (2013.01);
(Continued)

(58) Field of Classification Search
CPC .................................................... G06Q 20/047
See application file for complete search history.

(56) References Cited

U.S. PATENT DOCUMENTS 7,295,992 B2 * 11/2007 Villaret .................. G06Q 20/20 705/16
9,123,037 B2 * 9/2015 Dismukes ............ G06Q 20/204
(Continued)

OTHER PUBLICATIONS

Cashless transaction for resort club amenities using RFID technology, IEEE (Year: 2017).*
(Continued)

*Primary Examiner* — Bruce I Ebersman
(74) *Attorney, Agent, or Firm* — INNOVATION CAPITAL LAW GROUP, LLP; Vic Lin

(57) ABSTRACT

The described payment processing system enables the implementation of a product purchase reward scheme. The system consists of an EFTPOS terminal, an optical scanner connected to the terminal, and a reward scheme server accessible through a wide area network. The EFTPOS terminal includes a memory device storing product data with IDs and prices, a scanning controller to determine the price from scanned IDs, a digital display with a user interface to show scanned products, a card reader and payment controller for financial transactions, and a server interface controller to transmit transaction data to the server. The reward scheme server contains a database with multiple reward rules associated with product IDs. A rule controller retrieves matching rules, determines reward amounts and provider IDs, and instructs the payment controller to initiate financial transactions accordingly.

18 Claims, 3 Drawing Sheets

(51) Int. Cl.
*G06Q 20/34* (2012.01)
*G06Q 20/38* (2012.01)
*G06Q 20/40* (2012.01)

(52) U.S. Cl.
CPC ........... *G06Q 20/208* (2013.01); *G06Q 20/34* (2013.01); *G06Q 20/3827* (2013.01); *G06Q 20/389* (2013.01)

(56) References Cited

U.S. PATENT DOCUMENTS 9,582,598 B2 * 2/2017 Kalgi ................... G06Q 20/227
9,978,099 B2 * 5/2018 Rephlo .................. G06Q 40/02
10,223,691 B2 * 3/2019 Katzin ............... G06Q 30/0623
10,482,497 B2 * 11/2019 Poole ................. G06Q 30/0255
10,579,998 B1 * 3/2020 Newman .............. G06Q 20/352
10,586,227 B2 * 3/2020 Makhdumi ........ G06Q 20/3276
10,803,449 B2 * 10/2020 Kalgi ................... G06Q 20/363
11,783,310 B1 * 10/2023 Seiderman ........... G06Q 20/204 705/18
2002/0026367 A1 * 2/2002 Villaret .............. G06Q 20/3227 705/17
2002/0046184 A1 * 4/2002 Villaret .............. G06Q 20/3227 705/64
2007/0064262 A1 * 3/2007 Silverbrook ............. B41J 3/445 358/1.9
2007/0066341 A1 * 3/2007 Silverbrook .......... G06F 1/1626 455/557
2012/0209749 A1 * 8/2012 Hammad ........... G06Q 20/3674 705/27.1
2013/0159081 A1 * 6/2013 Shastry ................ G06Q 20/384 705/14.23
2014/0108260 A1 * 4/2014 Poole ................... G06Q 20/306 705/64
2014/0207572 A1 * 7/2014 Poole ................. G06Q 30/0255 705/14.53
2014/0207680 A1 * 7/2014 Rephlo ................ G06Q 20/306 705/44
2014/0214644 A1 * 7/2014 Rephlo .................. G06Q 40/02 705/35
2014/0279534 A1 * 9/2014 Miles ................. G06Q 20/4016 705/44
2015/0046240 A1 * 2/2015 Moreton ............ G06Q 30/0225 705/14.17
2015/0058105 A1 * 2/2015 Fonseca ............. G06Q 30/0226 705/14.17
2016/0012465 A1 * 1/2016 Sharp ................... G06Q 20/321 705/14.17
2018/0216946 A1 * 8/2018 Gueye .................. G01C 21/343
2019/0303807 A1 * 10/2019 Gueye .................... G06Q 10/02
2022/0405740 A1 * 12/2022 Graylin ................ G06Q 20/385

OTHER PUBLICATIONS

Card-based Macropayment for Mobile Phones, IEEE (Year: 2008).*

International Preliminary Report on Patentability (Chapter II) dated Jun. 20, 2024 from PCT Application No. PCT/AU2023/050655, 6 pages.

International Search Report & Written Opinion dated Oct. 5, 2023 from PCT Application No. PCT/AU2023/050655, 11 pages.

* cited by examiner

PAYMENT PROCESSING SYSTEM

FIELD OF THE INVENTION

This invention relates generally to payment processing systems and, more particularly, this invention relates to a payment processing system modified to overcome technical challenges of obtaining product data and whilst adhering to PCI standards when implementing a product purchase reward scheme.

BACKGROUND OF THE INVENTION

According to conventional product purchase payment processing systems, A POS system stores product data. When a product is scanned at checkout, the POS system retrieves product data, including price.

The POS system interfaces a separate EFTPOS terminal. The EFTPOS terminal is a separate device which is typically issued by a financial institution and is required to meet stringent PCI compliance requirements which is why the POS system cannot initiate financial transactions itself.

For payment, the POS system transmits a total amount to be paid to the EFTPOS terminal. The EFTPOS terminal displays the total amount to the customer and takes payment by reading a primary account number (PAN) of a payment card.

The EFTPOS terminal then interfaces an acquirer/issuer to process payment using a card scheme and, upon receipt of successful acknowledgement from the acquirer/issuer, transmits a successful payment notification to the POS system.

However, when implementing a product purchase reward scheme, it is required to obtain product data. However, POS systems are provided by various providers, and it is therefore difficult to implement a system universally which is able to interface with all POS systems to obtain such product data. Moreover, POS system providers typically lockdown their systems, denying API access thereto or disallowing software agent installation thereon.

It is further not possible to obtain such product data from the EFTPOS terminal. The EFTPOS terminal is required to meet stringent PCI requirements and no modification may be made thereto, including by updating of the firmware thereof, selection of software agents, connection of associated devices or the like.

As such, the present invention seeks to provide a way which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a payment processing system able to overcome the technical challenges of conventional payment systems of obtaining product data and/or adhering to PCI standards when implementing a reward scheme.

The system comprising a modified EFTPOS terminal and an optical scanner in operable communication with the EFTPOS terminal.

The system may further comprise a reward scheme server in operable communication with the EFTPOS terminal across a wide area network.

The EFTPOS terminal is modified in comprising a memory device storing product data comprising product IDs stored in relation to respective product prices and a scanning controller configured to ascertain product prices from the stored product data within memory using a product ID scanned by the optical scanner.

The EFTPOS terminal further comprises a digital display and a user interface controller configured to display a plurality of scanned products on the digital display.

The EFTPOS terminal also has a card reader and payment controller configured to read a PAN from a card for initiating the financial transaction for a total amount of the scanned products.

The EFTPOS terminal further has a server interface controller configured to transmit transaction data to the server, the transaction data comprising product IDs of the scanned products.

Preferably, the reward scheme server comprises a database comprising a plurality of reward rules, each associated with an associated product ID and a rule controller configured to retrieve at least one rule matching a product ID. As such, the rule controller is configured to determine a reward amount associated with the rule, determine a provider ID associated with the rule and cause a payment controller to initiate at least one financial transaction according to the provider ID and the reward amount.

The reward scheme server may further comprise a refund controller configured to receive the transaction ID from the EFTPOS terminal, select the transaction from the transaction log using the transaction ID and cause the payment controller to initiate at least one reversal financial transaction according to the transaction amount and/or reward amount using the PAN.

As such, the present EFTPOS terminal designed in this way can therefore be fully PCI compliant to thereby interface with a card scheme.

Furthermore, the present EFTPOS terminal configured in this way, including being configured to store product data itself, is able to take payment and is thereby able to ascertain the required product data itself for transmission to the server for implementation of the reward scheme.

As such, the present system avoids API access of POS systems or software agent installation thereon and may yet able to maintain PCI compliance.

The present system may be further configured for reversal of reward amount payments for product returns.

The system may be configured so that the EFTPOS terminal transmits the PAN number to the server which is stored with transaction log data and associated with a transaction ID which may be printed on a customer receipt. As such, products may be returned using the transaction ID and wherein the server is able to retrieve the transaction log data to identify the implemented reward payment transactions and initiate reversal financial transactions using the stored PAN number.

The EFTPOS terminal may be configured to display options to refund the transaction amount wherein the refund controller causes the payment controller to initiate a reversal financial transaction according to the transaction amount using the PAN or refund a partial transaction amount wherein the EFTPOS terminal transmits the partial transaction amount to the server and the refund controller causes the payment controller to initiate a reversal financial transaction according to the partial transaction amount using the PAN.

The EFTPOS terminal may be configured to display options to refund the reward amount only wherein the refund controller causes the payment controller to initiate the at least one reversal financial transaction according to the reward amount using the PAN or refund a transaction amount and the reward amount wherein the refund controller determines the transaction amount using the transaction log and causes the payment controller to initiate a reversal financial transaction according to the transaction amount using the PAN and the refund controller causes the payment controller to initiate another reversal financial transaction according to the reward amount using the PAN.

The payment controller may be further configured to store a plurality of product IDs in the transaction log against the transaction ID.

As such, the EFTPOS terminal may be configured to display an option to refund all products wherein the refund controller is configured to select the plurality of product IDs using the transaction ID, and, for each product ID, cause the payment controller to initiate a reversal financial transaction according to a reward amount associated with each product ID. The payment controller may furthermore initiate a reversal financial transaction according to the total original transaction amount for all products.

The EFTPOS terminal may be configured to display an alternative option to refund a subset of products and to transmit selected product IDs of the subset of products to the server, wherein the refund controller is configured to select a subset of product IDs using the selected product IDs, and, for each product ID, cause the payment controller to initiate a reversal financial transaction according to the total original transaction amount for the selected subset of products, and a reversal financial transaction according to a reward amount associated with each product ID.

The refund controller may be configured to verify the product ID against the transaction log.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
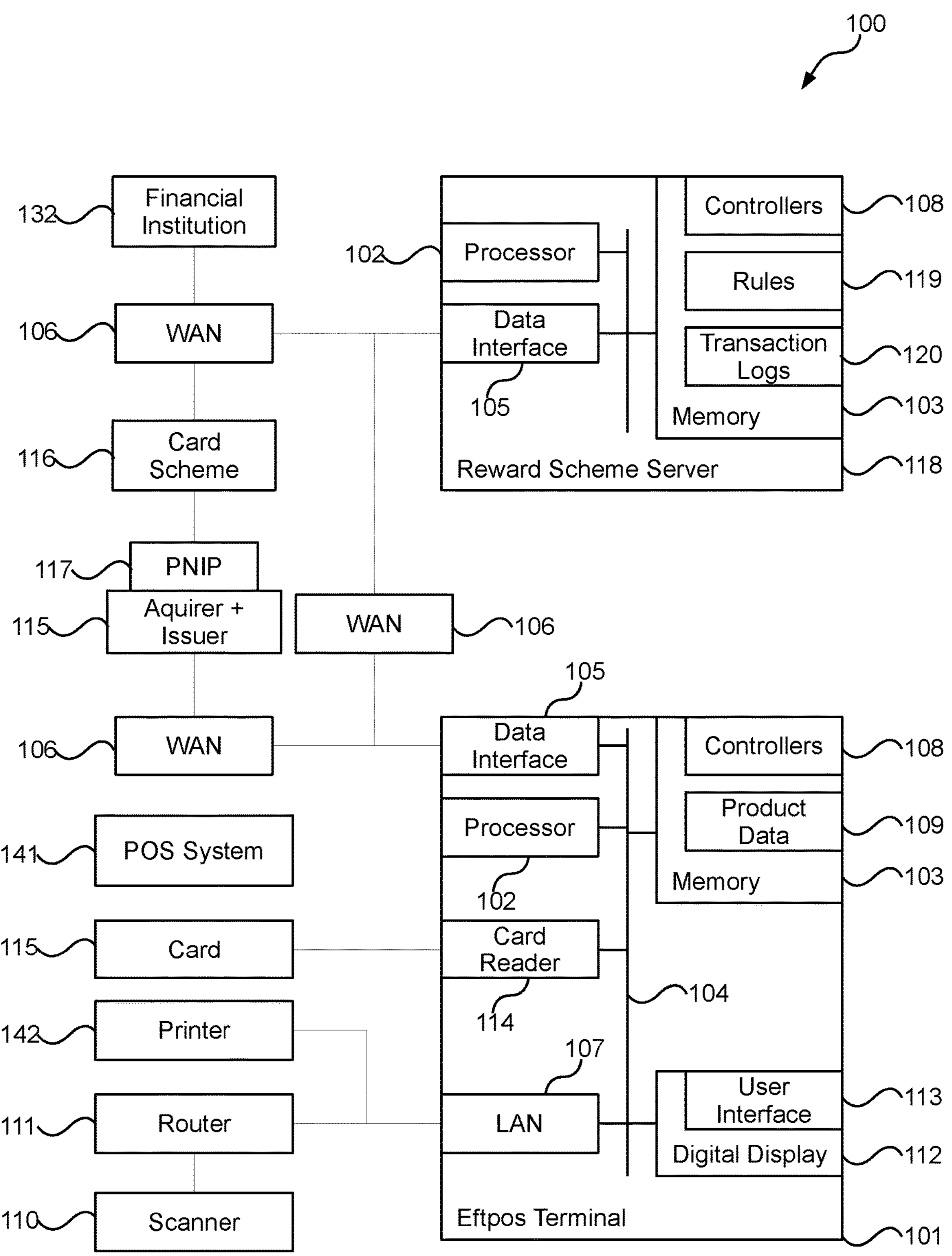
FIG. 1 shows a payment processing system in accordance with an embodiment.

FIG. 1 shows a payment processing system 100 for implementing a product purchase reward scheme. The system 100 comprises a modified EFTPOS terminal 101.

The EFTPOS terminal 101 comprises a processor 102 for processing digital data. A memory device 103, in operable communication with the processor 102 via a system bus 104 stores digital data including computer program code instructions.

In use, the processor 102 fetches these computer program code instructions and associated data for implementing the computer system functionality described herein.

These computer program code instructions may be logically divided into a plurality of computer program code instruction controllers 108, including those which will be described in further detail below. The memory 103 stores product data 109. The product data 109 comprises product IDs (such as barcode numbers) stored in relation to product prices and other associated data.

The EFTPOS terminal 101 further comprises a data interface 105 for sending and receiving data across a wide area network.

The EFTPOS terminal 101 may further comprise a local area network interface 107 for sending and receiving data across a local area network.

The system 100 further comprises an optical scanner 110 in operable communication with the EFTPOS terminal 101. The EFTPOS terminal 101 may wirelessly interface the scanner 110 across the local area network using a wireless router 111.

The EFTPOS terminal 101 may further be in operable communication with a printer 142 (which may be inbuilt), including for printing purchase receipts.

The EFTPOS terminal 101 may further comprise a digital display 112 and a user interface controller configured to display a user interface 113 thereon. The digital display 113 may comprise a haptic overlay for the receipt of user input gestures in relation to the digital information displayed thereon. As will be described in further detail below, the user interface 113 may display a listing of a plurality of products scanned by the scanner 110 and may be usable to make adjustments thereto and to make payment therefor.

The EFTPOS terminal 101 further comprises a card reader 114, configured to read a PAN (primary account number) of a payment card 115, such as a credit or debit card. It should be noted that the card reader 114 may read PAN numbers from virtual cards implemented by mobile communication devices.

When processing payment, the EFTPOS terminal 101 may interface with an acquirer/issuer 115 to take payments using a card scheme 116 via a payment network interface processor 117.

The system 100 further comprises a reward scheme server 118. The server 118 may also comprise a processor 102, memory device 103, data interface 105 and various controllers 108.

The memory 103 of the server 118 may further comprise a plurality of reward rules 119 and may store transaction logs 120.

The EFTPOS terminal 101 is preferably a standalone physical device which is PCI compliant. The EFTPOS terminal 101 may be PCI compliant wherein the EFTPOS terminal at least one of implements a data protection firewall, implements password protection, at least one of restricts access to and encrypts cardholder data, encrypts transmission of cardholder data to the reward scheme server 118 and creates access logs.

Figure 2:
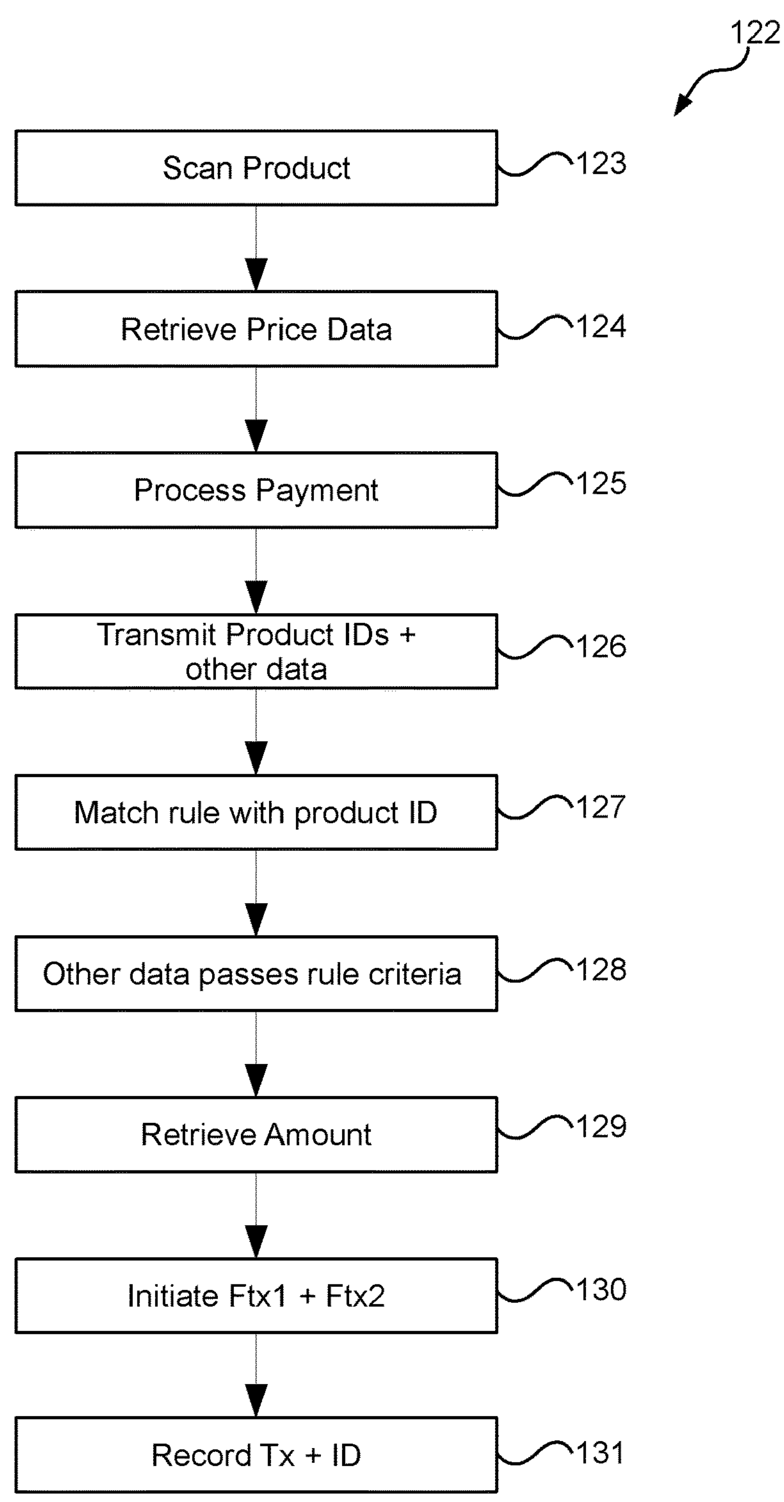
FIG. 2 shows exemplary processing by the system.

FIG. 2 illustrates exemplary processing implemented by the system 100.

At step 123, at least one product is scanned using the scanner 110. The scanner 100 ascertains the barcode number of each product and transmits the barcode to the EFTPOS terminal 101 as a product ID. In this example, two cans of Coke are scanned and, as such, the barcode numbers are each are transmitted to the EFTPOS terminal 101 in series. Where a product has no barcode (such as fresh produce), a unique product identify may be manually entered into the user interface 113.

At step 124, a scanner controller receives the product IDs from the scanner 110 and retrieves the associated product data from the product data 109 stored in memory 103. The product data comprises at least product price. In this example, each can of Coke is three dollars.

The user interface controller may update the user interface 113 to display a listing of two cans of Coke. If required, the user interface 113 may be used to remove items, adjust the amount thereof and/or cancel transactions. The user interface 113 may further display a total amount of the scanned products. In this example, the user interface 113 is controlled by the user interface controller to display two cans of Coke at three dollars each for a total of six dollars.

The user interface may further comprise a payment initiation button which, at step 125, configures the card reader 114 to read the PAN from the card 115.

At step 125, the EFTPOS terminal 101 may process payment for the total amount of scanned products by communicating with the acquirer/issuer across the wide area network 106.

Upon the EFTPOS terminal 101 receive confirmation of successful payment, at step 126, the server interface controller is configured to transmit transaction data to the server 118. The transaction data comprises product IDs of the scanned products. In this example, the server interface controller will transmit two product IDs for the two cans of Coke. Alternatively, one product ID may be transmitted with a quantity for the same type of product.

At step 127, the server 118 is configured to match a rule from the reward rules 119 with a product ID.

Each rule comprises an associated product ID. Furthermore, rules 119 may be associated with various product providers and therefore each rule may comprise an associated provider ID.

As such, the rule controller is configured to iterate each of the rules 119 to find rules having product IDs matching those received from the EFTPOS terminal 101.

In this case, there is a rule specified by the Coca-Cola company specifying the product ID for a can of Coke.

The rules may further be associated with reward amounts. In this example, the Coca-Cola company has specified a reward of $0.10 for each can of Coke purchased.

The server 118 may expose a web interface, API or the like through which various providers may configure rules 119 autonomously.

As such, at step 129, the rule controller retrieves the reward amount of $0.10 specified by the matching rule and thereby calculates that a reward amount of $0.20 is due for the two cans of Coke purchased.

At step 130, the rule controller causes a payment controller of the server 118 to initiate at least one financial transaction according to the provider ID and the reward amount specified by the matching rule. In embodiments, the system 100 has API access to control a holding account at a financial institution 132. As such, the payment controller may initiate a debit transaction to debit $0.20 from an account associated with the Coca-Cola company in favour of the holding account into initiate a credit transaction to credit $0.20 in favour of an account associated with the card 115.

In this regard, the EFTPOS terminal 101 preferably transmits the PAN number with the transaction data to the server 118. As such, the payment controller of the server 118 is able to implement the credit transaction using the PAN number to credit the amount to an account associated with the card 115.

In embodiments, the EFTPOS terminal 101 is further configured to transmit other data with the transaction data to the server 118. Furthermore, at least one rule may comprise criteria and wherein the rule controller is configured to further determine whether the other data fulfils the criteria.

The other data may comprise a merchant ID so that the rules are applicable only to certain merchants.

In embodiments, the other data may comprise a location and wherein a criterion specifies a region. The location data may be coded to the EFTPOS terminal 101 during initial system set up or determine dynamically, such as by IP address.

In further embodiments, the other data may comprise a product price and wherein a criterion comprises a price threshold. For example, a provider may specify that a rule is only applicable if a can of Coke is purchased for more than $2.50.

In further embodiments, the criteria may comprise a time-of-day criterion.

It should be noted that the rules 119 may comprise more than one rule associated with a product ID. For example, both a merchant and a provider may configure rules both of which are implemented by the rule controller.

At step 131, the rule controller is configured for storing a transaction record. The transaction record may comprise a unique transaction ID, and may store at least one of the product ID, provider ID, reward amount, transaction details and the like.

Figure 3:
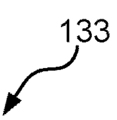
FIG. 3 shows exemplary processing by the system for refunding reward amount payments for returned products.
Figure 3:
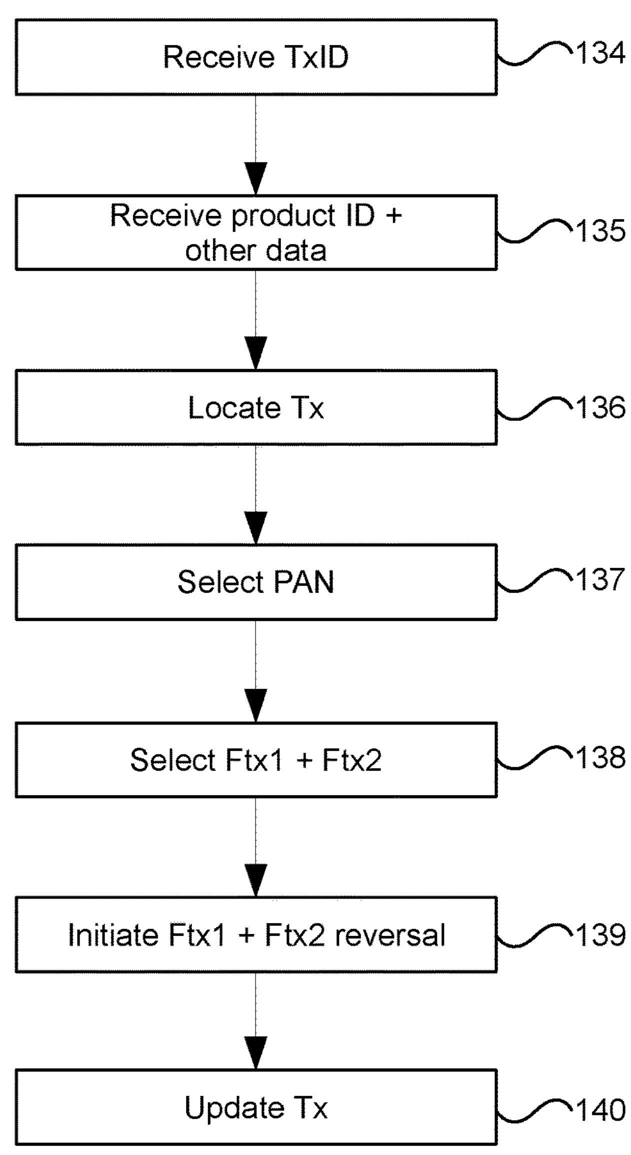

FIG. 3 illustrates exemplary processing 113 implemented by the system 100 for refunding reward amount payments for returned products.

At step 134, the server 118 receives a transaction ID. When processing payment, the EFTPOS terminal 101 may issue a paper receipt using the printer 142. The receipt may comprise a transaction ID.

As such, when refunding a product, the transaction ID may be input into the EFTPOS terminal 101 and transmitted to the server 115.

At step 136, a refund controller of the server 118 retrieves transaction data from the transaction log using the transaction ID. In this example, the transaction data specifies that two cans of Coke were purchased, and debit and credit transactions were implemented for $0.20 involving an account associated with the provider and a PAN associated with an account of the card 115.

If the refund controller cannot locate the transaction from the transaction logs, the server 118 may transmit a decline notification to the EFTPOS terminal 101 which is displayed in the user interface 113 thereof.

However, when locating the matching transaction using the transaction ID, the refund controller may retrieve the PAN from the transaction log 120 at step 137.

In embodiments where in the PAN is not stored within the transaction log, the PAN may be obtained by the EFTPOS terminal 101 from the customer's payment card 115.

In embodiments to avoid having to store PANs (even in encrypted format), a one-way hash of the PAN is stored in the transaction log 120 and wherein a PAN obtained by the EFTPOS terminal 101 from the customer's payment card 115 is hashed using the same one-way hash algorithm to verify that the same payment card 115 is being used for the refund transaction as was used for the original transaction.

Furthermore, the refund controller is able to retrieve a provider ID from the transaction log data and thereby look up an account associated with the provider ID.

At step 138, the refund controller retrieves a record of the previously implemented financial transactions, including the reward amounts thereof.

As such, at step 139, the refund controller is able to initiate reversal financial transactions to reverse the previous financial transactions. Specifically, the refund controller may initiate a debit transaction to debit the reward amount from an account associated with the card 115 specified by the PAN and initiate a further credit transaction to credit the reward amount to an account associated with the provider ID. At step 140, the transaction may be updated accordingly.

In embodiments, the EFTPOS terminal 101 may be configured to display options to refund the transaction amount wherein the refund controller causes the payment controller to initiate a reversal financial transaction according to the transaction amount using the PAN or refund a partial transaction amount wherein the EFTPOS terminal transmits the partial transaction amount to the server and the refund controller causes the payment controller to initiate a reversal financial transaction according to the partial transaction amount using the PAN.

In other words, for a transaction of $20, the options may be used to either refund the $20 transaction amount (and the associated reward amount) or, alternatively, partial transaction amount of $18 may be input into the user interface 113 of the EFTPOS 101 wherein and $18 transaction amount is refunded (and the associate reward amount). In embodiments, the full reward amount is refunded by the payment controller for a partially refunded transaction amount. Alternatively, the payment controller may be configured to initiate a partial reward amount proportionate to the partial transaction amount.

In embodiments, the EFTPOS terminal 101 may be configured to display options to refund the reward amount only wherein the refund controller causes the payment controller to initiate the at least one reversal financial transaction according to the reward amount using the PAN or refund a transaction amount and the reward amount wherein the refund controller determines the transaction amount using the transaction log and causes the payment controller to initiate a reversal financial transaction according to the transaction amount using the PAN and the refund controller causes the payment controller to initiate another reversal financial transaction according to the reward amount using the PAN.

The payment controller may be further configured to store a plurality of product IDs in the transaction log against the transaction ID.

As such, the EFTPOS terminal 101 may be configured to display an option to refund all products wherein the refund controller is configured to select the plurality of product IDs using the transaction ID, and, for each product ID, cause the payment controller to initiate a reversal financial transaction according to a reward amount associated with each product ID.

The EFTPOS terminal may also be configured to display an alternative option to refund a subset of products and to transmit selected product IDs of the subset of products to the server, wherein the refund controller is configured to select a subset of product IDs using the selected product IDs, and, for each product ID, cause the payment controller to initiate a reversal financial transaction according to a reward amount associated with each product ID. In accordance with this embodiment, the scanner 110 may be used to scan the products to be refunded, wherein the scanner 110 ascertains the product IDs for transmittal to the server 118.

The payment controller may furthermore initiate a reversal financial transaction according to the original transaction amount for all products or, where only a subset of products are selected using the EFTPOS terminal, a reversal financial transaction according to the original transaction amount for the selected subset of products.

In embodiments, at step 135 the system 100 requires that the refunded product also be scanned for verification purposes. As such, the product ID may also be transmitted from the EFTPOS terminal 101 to the server 118 so that the refund controller can verify the product ID against the transaction log. Other data may also be transmitted by the EFTPOS terminal 101 to the server 118 for verification purposes. For example, the server 118 may verify that the product is returned at the same location, to the same merchant and the like.

As is evident from FIG. 1, the EFTPOS terminal 101 need not interface the POS system 141. However, at the end of the day, the EFTPOS terminal 101 may be configured to print a purchase transaction batch report using the printer 142 which may be manually entered into the POS system 141 if required. The batch report may include the quantity and price of each product sold during a time period.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A payment processing system for implementing a product purchase reward payment, the system comprising:

an EFTPOS terminal;

an optical scanner in operable communication with the EFTPOS terminal using a scanning controller, wherein the EFTPOS terminal comprises:

a firewall configured to implement data protection;

an encryption module configured to encrypt cardholder data and encrypt transmission of cardholder data to a reward scheme server;

a memory device preprogrammed with product data comprising product IDs stored in relation to respective product prices, wherein the EFTPOS terminal is configured to store the product data locally in the memory device and use the scanning controller to ascertain the product price from a product ID scanned by the optical scanner using the locally stored product data, and wherein the firewall and encryption module are integrated within the EFTPOS terminal to secure both the locally stored product data and the transmission of transaction data to the reward scheme server;

a digital display and a user interface controller configured to display a plurality of scanned products on the digital display and wherein the EFTPOS terminal is configured to calculate a total amount of the plurality of scanned products;

a card reader and payment controller configured to read a PAN from a card for initiating a financial transaction for the total amount, wherein the payment controller is configured to generate and store a hash of the PAN using a one-way hashing algorithm, wherein the EFTPOS terminal is a PCI compliant standalone device, and wherein the one-way hashing algorithm avoids storage of the PAN by the reward scheme server, thereby maintaining PCI compliance of the EFTPOS terminal; and a server interface controller configured to transmit transaction data to a reward scheme server, the transaction data comprising product IDs of the scanned products; and a reward scheme server in operable communication with the EFTPOS terminal across a wide area network, wherein the reward scheme server comprises:

a database comprising a plurality of reward rules, each associated with an associated product ID;

a rule controller configured to:

retrieve at least one rule matching a product ID;

determine a reward amount associated with the rule;

determine a provider ID associated with the rule;

cause a payment controller to initiate at least one financial transaction according to the provider ID and the reward amount; and store a transaction log comprising a transaction ID of the financial transaction and a hash of the PAN generated using the one-way hashing algorithm; and a refund controller configured to:

receive the transaction ID from the EFTPOS terminal;

select the transaction from the transaction log using the transaction ID;

receive a further PAN obtained by the EFTPOS terminal from a payment card;

generate a further hash of the further PAN using the one-way hashing algorithm;

compare the hash stored in the transaction log and the further hash; and upon the hash and the further hash matching, cause the payment controller to initiate at least one reversal financial transaction according to the reward amount using the further PAN.

2. The system as claimed in claim 1, wherein the EFTPOS terminal is PCI compliant.

3. The system as claimed in claim 2, wherein the EFTPOS terminal is configured to perform at least one of:

password protection;

access restriction to and encryption of cardholder data;

transmission encryption of cardholder data to the reward scheme server; and creation of access logs.

4. The system as claimed in claim 1, wherein the transaction data further comprises other data, wherein at least one of the rules is associated with a criterion and wherein the rule controller is configured to further determine whether the other data fulfils the criterion.

5. The system as claimed in claim 4, wherein the other data comprises a merchant ID.

6. The system as claimed in claim 4, wherein the other data comprises a location and wherein the criterion specifies a region.

7. The system as claimed in claim 4, wherein the other data comprises a product price and wherein the criterion is a price threshold.

8. The system as claimed in claim 4, wherein the criterion is a time-of-day criterion.

9. The system as claimed in claim 1, wherein more than one rule is associated with a product ID.

10. The system as claimed in claim 1, wherein:

the EFTPOS terminal is configured to transmit the PAN to the reward program server with the transaction data;

the payment controller is further configured to store the PAN in the transaction log against the transaction ID; and the refund controller is configured to select the PAN from the transaction log using the transaction ID.

11. The system as claimed in claim 1, wherein the EFTPOS terminal is configured to display options to either:

refund the transaction amount wherein the refund controller causes the payment controller to initiate a reversal financial transaction according to the transaction amount using the PAN; or refund a partial transaction amount wherein the EFTPOS terminal transmits the partial transaction amount to the server and the refund controller causes the payment controller to initiate a reversal financial transaction according to the partial transaction amount using the PAN.

12. The system as claimed in claim 1, wherein the EFTPOS terminal is configured to display options to either:

refund the reward amount only wherein the refund controller causes the payment controller to initiate the at least one reversal financial transaction according to the reward amount using the PAN; or refund a transaction amount and the reward amount wherein:

the refund controller determines the transaction amount using the transaction log and causes the payment controller to initiate a reversal financial transaction according to the transaction amount using the PAN; and the refund controller causes the payment controller to initiate a reversal financial transaction according to the reward amount using the PAN.

13. The system as claimed in claim 1, wherein the payment controller is further configured to store a plurality of product IDs in the transaction log against the transaction ID.

14. The system as claimed in claim 13, wherein the EFTPOS terminal is configured to display an option to refund all products wherein the refund controller is configured to select the plurality of product IDs using the transaction ID, and, for each product ID, cause the payment controller to initiate a reversal financial transaction according to any reward amount associated with each product ID.

15. The system as claimed in claim 14, wherein the refund controller is further configured to cause the payment controller to initiate a reversal financial transaction according to a total transaction amount of the products.

16. The system as claimed in claim 13, wherein the EFTPOS terminal is configured to display an option to refund a subset of products and to transmit selected product IDs of the subset of products to the server, wherein the refund controller is configured to select a subset of product IDs using the selected product IDs, and, for each product ID, cause the payment controller to initiate a reversal financial transaction according to any reward amount associated with each product ID.

17. The system as claimed in claim 16, wherein the refund controller is further configured to cause the payment controller to initiate a reversal financial transaction according to a total transaction amount of the subset of the products.

18. The system as claimed in claim 10, wherein a product ID is transmitted from the EFTPOS terminal to the server and wherein the refund controller is configured to verify the product ID against the transaction log.

* * * * *